United States Patent [19]
McIntosh

[11] 3,824,440
[45] July 16, 1974

[54] STEPPING MOTOR CONTROL SYSTEM
[75] Inventor: Michael D. McIntosh, Greencastle, Pa.
[73] Assignee: Landis Tool Company, Waynesboro, Pa.
[22] Filed: Aug. 2, 1972
[21] Appl. No.: 277,143

[52] U.S. Cl................. 318/696, 318/341, 318/434
[51] Int. Cl............................................. H02k 37/00
[58] Field of Search .......... 318/341, 171, 696, 685, 318/254, 138, 345, 432, 434

[56] References Cited
UNITED STATES PATENTS

| | | | |
|---|---|---|---|
| 3,290,573 | 12/1966 | Kamens | 318/171 |
| 3,412,307 | 11/1968 | Welsh | 318/394 |
| 3,414,795 | 12/1968 | Weiser | 318/341 |
| 3,452,263 | 6/1969 | Newell | 318/696 |
| 3,453,514 | 7/1969 | Rokes et al. | 318/138 |
| 3,495,149 | 2/1970 | Swain | 318/138 |
| 3,526,819 | 9/1970 | Graf | 318/341 |
| 3,560,817 | 2/1971 | Amato | 318/138 |
| 3,577,176 | 5/1971 | Kreithen | 318/685 |

Primary Examiner—G. R. Simmons
Attorney, Agent, or Firm—Robert S. Smith

[57] ABSTRACT

An improved method of driving a stepping motor utilizes a high voltage power supply and a control system which causes high rates of change of motor winding current to obtain high response speed and torque. Feedback is utilized to sense current level and a corrective action is taken when the current being monitored deviates from predetermined maximum or minimum limits. Such limits are necessary to prevent damage to the motor caused by excess current or stalling of the motor caused by too little current. The rate of change of current is a function of circuit parameters, motor parameters, and motor torque. Corrections may occur typically 4,000 times per second. Each of the motor windings is controlled by a bridge-amplifier circuit having two pairs of transistors connected in series with the motor winding coupled between two center points. The line current from each circuit is connected to a single driver to control the rotational speed and direction of the motor shaft.

4 Claims, 3 Drawing Figures

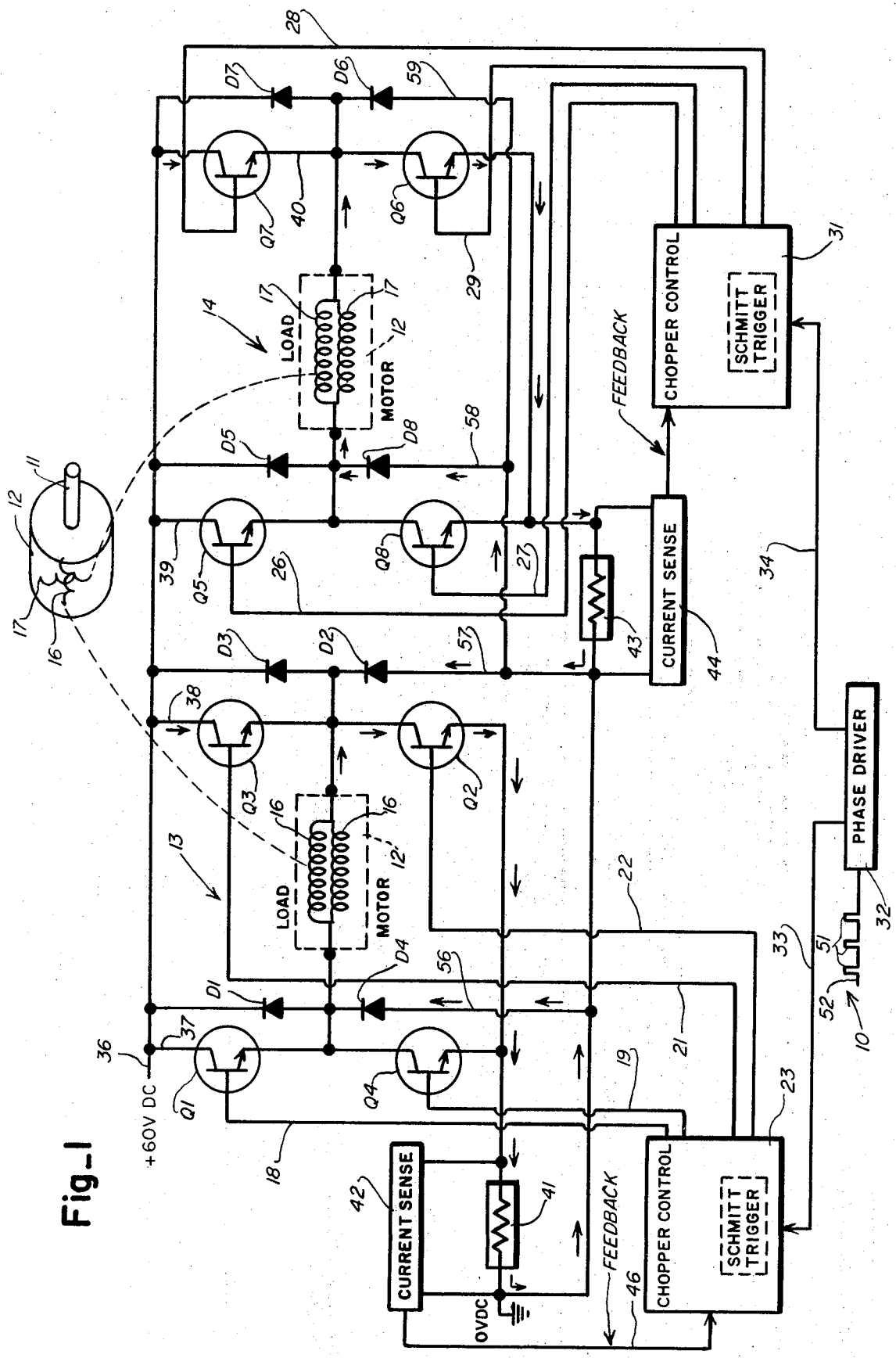

Fig_2
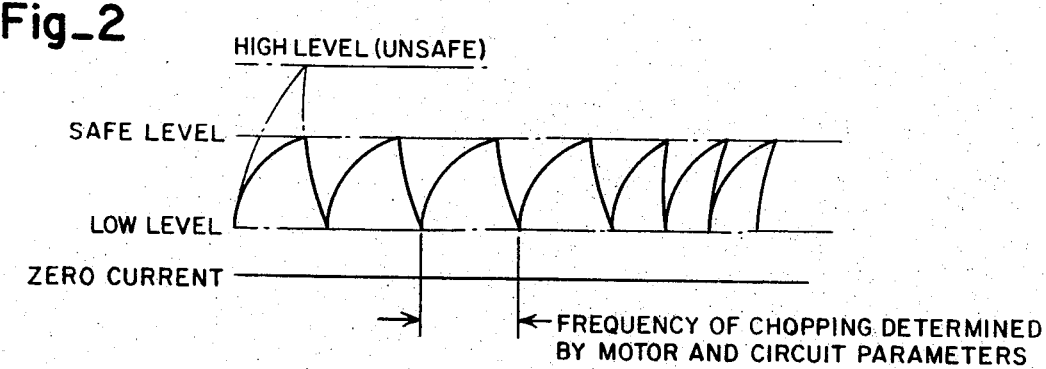
Fig_3
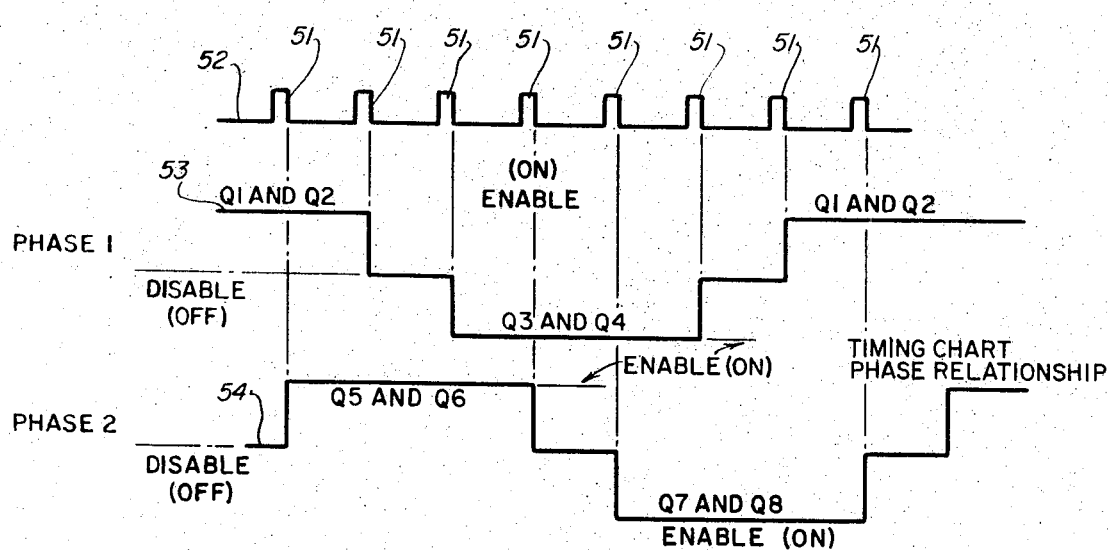

3,824,440

STEPPING MOTOR CONTROL SYSTEM

BACKGROUND OF THE INVENTION

1. Field of the Invention

An improved control for a stepping motor is disclosed which utilizes feedback by sensing current levels to each of the motor windings and to control current to the stepping motor windings to vary rotational speed and direction of the stepping motor shaft at a level which will not damage the motor.

2. Description of the Prior Art

An early method of controlling the voltage to a stepping motor was provided by means of a conventional symetrical bridge circuit. The voltage across the motor windings varied when the current supply was out of balance; however, means were not provided for the effects of inductance level variations to be fed back to increase the voltage in response to the torque on the motor. Such controls limited winding current to levels which produced poor torque and speed characteristics.

In U.S. Pat. No. 3,577,176, granted May 4, 1971, the output torque of a stepping motor as indicated by current draw is compared to a preselected desired level. Error signals are used to vary the voltage applied to the winding to maintain a constant torque of the motor. This arrangement will provide safe operating speeds; however, the stepping motor will not be operating at its peak torque and speed capabilities. The system therein relies on a load resistor and the increase in inductive impendance of the motor which occurs with increasing rotational speed to limit winding current. The reliance on such current limiting measures inherently reduced the torque and speed of the motor below optimum values. The switching circuit employed therein is incapable of the rapid response that is desirable.

SUMMARY OF THE INVENTION

In accordance with the invention, there is provided an apparatus for driving a stepping motor which may be employed to drive an element of a mechine tool. One such application is for positioning a grinding wheel toward or away from a workpiece. The apparatus will drive the stepping motor at a current level which will not harm the motor. High current and low current levels are controlled by feedback circuitry to supply additional current to the stepping motor in response to an increase in torque demand. Each of the motor windings is controlled by a bridge-amplifier circuit which consists of two pairs of transistors connected in series with the motor winding connected between the center point of each pair.

The motor shaft is rotated in response to a phase driver which controls the enabling of the transistors in a specific sequence to provide smooth operation of the motor shaft as well as to control the direction of motor shaft rotation.

A primary object of the invention is to automatically increase the motor current when a demand for additional torque is required to provide superior torque and speed characteristics of a stepping motor.

Another object is to control the current level to the motor winding in response to the required torque and limit the current level to prevent damage to the motor.

The above and other features and advantages of the present invention will become better understood from the detailed description of the invention that follows when considered in connection with the accompanying drawings.

BRIEF DESCRIPTION OF THE DRAWINGS

FIG. 1 shows the preferred embodiment of the logic and feedback circuit for an improved method of driving a stepping motor;

FIG. 2 is a phase current diagram showing the operating level of current and the chopping pattern which is determined by the frequency produced by motor and circuit parameters; and FIG. 3 shows a timing chart of the phase relationship of the bi-directional stepping motor.

DETAILED DESCRIPTION OF THE PREFERRED EMBODIMENT

Referring now to FIG. 1, there is illustrated a logic circuit 10 for driving a rotor or shaft 11 of a stepping motor 12 to advance or retract a machine tool element (not shown). The circuit 10 is comprised of two four-transistor bridge or bridge amplifier circuits 13 and 14 which are coupled to the motor windings 16 and 17 of the stepping motor 12. The circuit 13 includes four NPN transistors Q1, Q2, Q3 and Q4 mounted in complementary pairs and the circuit 14 includes four NPN transistors Q5, Q6, Q7 and Q8 mounted in complementary pairs. The transistors Q1, Q2, Q3, Q4, Q5, Q6, Q7 and Q8 are energized in a specific sequence and in a timed relation to direct current through the motor windings 16 and 17 to provide rotation of the motor shaft 11. Each winding 16 and 17 has two portions connected in parallel, as shown in FIG. 1.

The stepping motor 12 in the preferred embodiment has one-hundred poles, and is capable of providing a high resolution of 0.9° per step with a total of 400 steps per revolution. The stepping action of the motor shaft 11 is repeatable in a forward or reverse direction giving precise angular movements in response to the drive sequence.

The transistors Q1, Q2, Q3 and Q4 are enabled respectively through lines 18, 19, 21 and 22 which are coupled to a chopper control block 23. The transistors Q5, Q6, Q7 and Q8 are enabled respectively through lines 26, 27, 28 and 29 which are coupled to the chopper control block 31. The phase or operational sequence is controlled by a phase driver 32 which is connected to the chopper control blocks 23 and 31 through lines 33 and 34 respectively. The correct sequence of operation for the transistors Q1, Q2, Q3, Q4, Q5, Q6, Q7, and Q8 as dictated by the phase driver 32 and implemented by the chopper control blocks 23 and 31, are shown in FIG. 3.

In the preferred embodiment, a power supply of +60 volts D.C. is supplied to a line 36 which is coupled to lines 37, 38, 39 and 40, which includes the transistors Q1 and Q4, Q3 and Q2, Q5 and Q8, and Q7 and Q4 respectively. Each of the above pairs of transistors is mounted in series. In operation, current flows through the winding 16 either through transistors Q1 and Q2 or through transistors Q3 and Q4. FIG. 3 shows diagrammatically the operational sequence of these transistor pairs. Similiarly, winding 17 receives power through the transistors Q7 and Q8 or through transistors Q5 and Q6. During the initial condition, current flow in the circuit 13 is directed through the line 37, through the transistor Q1, across the motor winding 16 and through the line 38 through the transistor Q2, as initially all of the other transistors Q3, Q4, Q5, Q6, Q7 and Q8 are disabled.

A resistor 41 is included in the line 38 which senses the voltage drop present as a result of the motor current passing through the resistor 41 The voltage drop is detected by a current sense block 42 which directs a voltage feedback signal to the chopper control block 23. The chopper control block 23 controls a safe level of operating current between upper and lower limits which are determined by the motor 12 and circuit parameters, as shown in FIG. 2. The chopper control block 23 will disable and enable the transistor Q1 in response to variation of winding 16 current level.

It should be understood that the winding current and inductance levels are a function of the torque load on the motor. Any increase thereof will result in an average increase in current to the winding 16. The transistor Q1 will be enabled and disabled at intervals during a Q1, Q2 drive pulse interval to provide a series of current pulses within safe operational limits of the motor as long as the transistor Q2 remains on, as determined by the phase driver 32.

The transistors Q5 and Q6 may be enabled to pass current through the motor winding 17 while the transistors Q1 and Q2 are still enabled to provide current pulses to cause rotation of the motor shaft 11. Current flow in circuit 14 is directed through the lines 39 and 40 and the current is directed through a resistor 43. A current sense block 44 measures the current and directs the corresponding feedback signal into the chopper control block 31. The transistor Q5 will be enabled and disabled in response to sensed voltage values deviating from the high and low voltage limits which are determined by the chopper control block 31.

When the transistors Q1 and Q2 are disabled while the transistors Q5 and Q6 remain enabled by the phase driver 32, the transistors Q3 and Q4 may be enabled in response to a change in the phase driver 32 state while the transistors Q5 and Q6 are still held in an enabled state. After still another interval, the transistors Q5 and Q6 will be disabled and one interval later, the transistors Q7 and Q8 will be energized by the phase driver 32 while the transistors Q3 and Q4 are still directing current through the motor winding 16. The output of the phase driver 32 is shown diagrammatically in FIG. 3. The output from the phase driver 32 causes reversal of the current in the stepping motor windings 16 and 17 to effect a continuous stepping operation of the stepping motor 12 within operational limits.

The chopper control blocks 23 and 31 (FIG. 1) include a conventional Schmitt Trigger circuit (not shown) to control the switching of the supply voltage to the circuits 13 and 14 in response to current above or below the upper and lower limits. The chopper control blocks 23 and 31 provide the proper sequence of operation of the pairs of transistors Q1 and Q2, Q3 and Q4, Q5 and Q6, as well as Q7 and Q8, as dictated by the phase driver 32, and in accordance with the timing chart as shown in FIG. 3.

Initially, the transistors Q1 and Q2 (FIG. 1) will be on and the transistor Q1 will be switched off and on by the chopper control block 23. When the transistor Q1 is on, +60V DC current will flow through the lines 36 and 37, through the transistor Q1 and through the motor winding 16, through the transistor Q2 and the resistor 41 by the line 38.

The current passing through the resistor 41 creates a voltage that is sensed by the circuit (not shown) within the current sense block 42, and feedback voltage will be directed to the chopper control block 23 by a line 46. The chopper control block 23 will shut off or deenergize the transistor Q1 when the voltage resulting from the motor current reaches the maximum high safe level. As shown in FIG. 1 diodes D2 and D4 are connected respectively in lines 56 and 57. Line 56 is connected between ground and the end of winding 16 which is connected to the emitter and collector of transistors Q1 and Q4. Line 57 is connected between ground and the end of winding 16 which is connected to the emitter and collector of transistors Q3 and Q2. Diodes D1 and D3 are connected between the line 36 and to opposite ends of the winding 16. When transistor Q1 is shut off, a current due to the collapsing field surrounding the winding 16 continues to flow through the resistor via transistor Q2, the resistor 41 and diode D4 as shown by arrows in FIG. 4. When this decaying current reaches a predetermined low level as shown in FIG. 2, transistor Q1 will be turned on and the current through the winding will again rise to the maximum safe level. As shown in FIG. 2 this action will repeat throughout a Q1 Q2 drive pulse interval. The same action will occur in a Q3 Q4 drive pulse interval with the path for decaying current due to collapsing field of the winding in this instance being through the winding 16, Q4, resistor 41, ground and diode D2. Diodes D1 and D3 are to prevent reverse current flow.

The circuit 14 includes lines 58 and 59 which are coupled to the lines 39 and 40 respectively and coupled to opposite sides of the motor winding 17. The diodes D5 and D8 are coupled to the line 58 and the diodes D6 and D7 are coupled to the line 59. As shown by arrows in FIG. 1 diode D6 provides a circuit for current due to the collapsing field around winding 17 when Q5 is shut off during a Q5 and Q6 drive pulse interval and diode D8 provides a similar circuit when Q7 is shut off during a Q7 Q8 drive pulse interval. The diodes D5 and D7 are used to prevent reverse current flow.

The transistor pairs Q3 and Q4, Q5 and Q6, as well as Q7 and Q8 will be energized by the phase driver 32 and the chopper control blocks 23 and 31 are energized in similar manner as described above. It should be noted that when the transistors Q3 and Q4 are energized, the transistor Q3 will be switched on and off at intervals by the chopper control block 23 while the transistor Q4 remains energized. Likewise, the transistors Q5 and Q7 will never be on continuously during the drive pulse intervals Q5 Q6 or Q7 Q8 as the case may be, but will be switched on and off according to the upper safe and lower current limits which are controlled by the chopper control block 31. Similarly transistors Q6 and Q8 will be energized continuously during the drive pulse intervals Q5 Q6 and Q7 Q8 as the case may be during which intervals transistors Q5 and Q7 will be switched on and off.

Rotation of the motor shaft 11 is determined by the input frequency pulses 51 which are directed into the phase driver 32. The pulses 51 are produced by a machine control logic unit (not shown) in a preselected quantity and rate. The frequency of pulses which are fed into the phase driver 32 will vary depending upon the desired speed of rotation required to move the load which may be an element of a machine tool (not shown). A line 52 in FIG. 3 shows an example of input frequency pulses 51 which are evenly spaced for uniform stepping operation of the motor shaft 11. Lines 53 and 54 represent the phase relationship of the operation of the pairs of transistors Q1 and Q2, Q3 and Q4, Q5 and Q6, as well as Q7 and Q8. One of these pairs is energized or deenergized in phase relationship with each frequency drive pulse.

In a typical operation as an example, corrective action in response to feedback from the motor current may be made at the rate of 4,000 corrections per second. However, the time delay between each of the drive pulses controls the switching of voltage for the bridge circuit 13 to the bridge circuit 14 in a sequence which is determined by the sequence of energizing the pairs of transistors Q1 and Q2, Q3 and Q4, Q5 and Q6, as well as Q7 and Q8 with the voltage controlled at a safe operating level.

It should be understood that when the frequency of the pulses 51 occurs faster than the capability of the circuit within the chopper blocks 23 and 31, the voltage level, as shown in FIG. 2, will not exceed or fall below an unsafe operating level. The motor shaft 11 will be rotated in increments as dictated by the repetitive sequence of directing current to the motor windings 16 and 17. The feedback arrangement and the measuring of the loading on the stepping motor 12 will automatically occur when the frequency of the pulses 51 are reduced to a rate within the range of the chopper blocks 23 and 31 to control.

It should be understood that the principles taught in this invention could be applied to control the operation of any electrical or electorhydraulic pulse stepping motor. The number of control circuits required will depend upon the number of windings or pair of windings within the stepping motor.

It is also to be understood that only a preferred embodiment of the invention has been specifically illustrated and described, and variations may be made thereto without departing from the invention, as defined in the appended claims.

I claim:

1. A control circuit for driving the windings of a stepping motor having a plurality of windings, said circuit being adapted to pass current through said windings in first and second directions over predetermined intervals according to a predetermined sequence to effect incremental rotation of the motor shaft comprising:

a four arm bridge circuit associated with each of said windings having input and output terminals with an associated winding connected across said output terminals, winding current sensing means including a resistor connected between one input terminal of each of said bridge circuits and ground, a power source connected across the other input terminal of each of said bridge circuits and ground, transistors in each arm of each of said bridge circuits defining first and second transistor pairs in opposite diagonal arms, said first pairs when enabled conducting current from said power source to ground through said windings in a first direction and said second pairs when enabled conducting current through said windings in a second direction, drive means for enabling conduction of said first or second transistor pairs in one or more of said bridge circuits over predetermined intervals according to a predetermined order, winding current control means responsive to the magnitude of winding current passing through said resistors associated with each of said bridge circuits, said winding current control means disabling one transistor in an enabled transistor pair when the magnitude of winding current exceeds a maximum level, and rectifier means connected between each of said bridge circuit output terminals and ground for carrying inductive current through the other enabled one of a transistor pair and said resistor when said one transistor of an enabled pair is disabled, said winding current control means reenabling the disabled one of an enabled pair of transistors to again provide a current path from the power source through the motor windings when the magnitude of winding current drops below a minimum level.

2. A circuit as recited in claim 1, said rectifier means comprising diodes.

3. A circuit as recited in claim 1, said winding current control means including a Schmidt trigger circuit.

4. A circuit as recited in claim 1 further comprising rectifier means connected between said bridge circuit output terminals and the input terminal connected to said power source.

* * * * *